United States Patent
Choi et al.

(10) Patent No.: US 12,555,818 B2
(45) Date of Patent: Feb. 17, 2026

(54) ANODE-LESS LITHIUM ION BATTERY

(71) Applicant: SYENSQO SA, Brussels (BE)

(72) Inventors: Ji-Ae Choi, Seoul (KR); Guillaume Müller, Woluwe-Saint-Pierre (BE); Lawrence Alan Hough, Seoul (KR); Hyun-Cheol Lee, Suwon (KR); Hee-Sung Choi, Seoul (KR); So-Young Lee, Seoul (KR)

(73) Assignee: SYENSQO SA, Brussels (BE)

( * ) Notice: Subject to any disclaimer, the term of this patent is extended or adjusted under 35 U.S.C. 154(b) by 637 days.

(21) Appl. No.: 17/918,740

(22) PCT Filed: Mar. 18, 2021

(86) PCT No.: PCT/EP2021/056900
§ 371 (c)(1),
(2) Date: Oct. 13, 2022

(87) PCT Pub. No.: WO2021/213743
PCT Pub. Date: Oct. 28, 2021

(65) Prior Publication Data
US 2023/0238567 A1   Jul. 27, 2023

(30) Foreign Application Priority Data
Apr. 22, 2020   (EP) .................................. 20170844

(51) Int. Cl.
*H01M 10/00* (2006.01)
*C07F 1/00* (2006.01)
(Continued)

(52) U.S. Cl.
CPC ......... *H01M 10/0525* (2013.01); *C07F 1/005* (2013.01); *H01M 4/0404* (2013.01);
(Continued)

(58) Field of Classification Search
CPC ......... H01M 10/0569; H01M 10/0567; H01M 10/0568; C07F 1/00
See application file for complete search history.

(56) References Cited

U.S. PATENT DOCUMENTS

| 2016/0072151 A1 | 3/2016 | Zhang et al. |
| 2016/0261000 A1 | 9/2016 | Zhang et al. |

(Continued)

FOREIGN PATENT DOCUMENTS

| EP | 3151314 A1 | 4/2017 |
| EP | 3370294 A1 | 9/2018 |

(Continued)

OTHER PUBLICATIONS

Chang et al., Anodeless Lithium Metal Battery and Method of Manufacturing the Same, Jul. 2017, See the Abstract. (Year: 2017).*

(Continued)

*Primary Examiner* — Tiffany Legette
*Assistant Examiner* — Monique M Wills
(74) *Attorney, Agent, or Firm* — Osha Bergman Watanabe & Burton LLP

(57) ABSTRACT

The present invention pertains to an anode-less lithium ion battery comprising a) a cathode comprising a cathode current collector and a cathode electro-active material on the cathode current collector; b) an anode current collector; c) a liquid electrolyte composition between the a) cathode and the b) anode current collector; and d) a separator, wherein the c) liquid electrolyte composition comprises i) at least 70% by volume (vol %) of a solvent mixture with respect to the total volume of the electrolyte composition, comprising at least one fluorinated ether compound and at least one non-fluorinated ether compound, and ii) at least one lithium salt.

14 Claims, 2 Drawing Sheets

(51) Int. Cl.
| | |
|---|---|
| *H01M 4/04* | (2006.01) |
| *H01M 10/0525* | (2010.01) |
| *H01M 10/0567* | (2010.01) |
| *H01M 10/0568* | (2010.01) |
| *H01M 10/0569* | (2010.01) |

(52) U.S. Cl.
CPC ... *H01M 10/0567* (2013.01); *H01M 10/0568* (2013.01); *H01M 10/0569* (2013.01); *H01M 2300/0034* (2013.01)

(56) References Cited

U.S. PATENT DOCUMENTS

| | | | |
|---|---|---|---|
| 2016/0344063 A1* | 11/2016 | Chang | H01M 4/525 |
| 2017/0133660 A1 | 5/2017 | Kurihara et al. | |
| 2018/0233778 A1* | 8/2018 | Park | H01M 10/0567 |
| 2019/0198933 A1 | 6/2019 | Newhouse et al. | |
| 2021/0336274 A1 | 10/2021 | Jung et al. | |

FOREIGN PATENT DOCUMENTS

| | | | |
|---|---|---|---|
| EP | 3379619 A1 | 9/2018 | |
| EP | 3509150 A1 * | 7/2019 | ......... H01M 10/052 |
| EP | 3540825 A1 | 9/2019 | |
| WO | 2019045399 A2 | 3/2019 | |

OTHER PUBLICATIONS

S. Liu et al., "Effect of nano-silica filler in polymer electrolyte on Li dendrite formation in Li/poly(ethylene oxide)-Li (CF3SO2)2N/Li", Journal of Power Sources, vol. 195, Issue 19, Oct. 1, 2010, pp. 6847-6853, (7 pages).

R. Sudo et al., "Interface behavior between garnet-type lithium-conducting solid electrolyte and lithium metal", Solid State Ionics, vol. 262, Sep. 1, 2014, pp. 151-154 (4 pages).

D. Aurbach et al., "A short review of failure mechanisms of lithium metal and lithiated graphite anodes in liquid electrolyte solutions", Solid State Ionics, vol. 148, 2002, Jun. 2, 2002, pp. 405-416 (12 pages).

H. Ota et al., "Effect of vinylene carbonate as additive to electrolyte for lithium metal anode", Electrochimica Acta, vol. 49, 2004, pp. 565-572 (8 pages).

L. Suo et al., "A new class of Solvent-in-Salt electrolyte for high-energy rechargeable metallic lithium batteries", Nature Communications, 4, Article No. 1481 (2013), pp. 1-9 (9 pages).

J. Qian et al., "High rate and stable cycling of lithium metal anode", Nature Communications, 6, Article No. 6362 (2015), p. 1-9 (9 pages).

H. Wang et al., "A Solvate Ionic Liquid as the Anolyte for Aqueous Rechargeable Li-O2 Batteries", ChemElectroChem, vol. 2, 2015, pp. 1144-1151, (8 pages).

J. Qian et al., "Anode-Free Rechargeable Lithium Metal Batteries", Advanced Functional Materials, vol. 26, No. 39, Aug. 18, 2016 pp. 7094-7102 (9 pages).

M. Genovese et al., "Measuring the Coulombic Efficiency of Lithium Metal Cycling in Anode-Free Lithium Metal Batteries", Journal of The Electrochemical Society, 2018, vol. 165, No. 14, pp. A3321-A3325 (5 pages).

A. J. Louli et al., "Exploring the Impact of Mechanical Pressure on the Performance of Anode-Free Lithium Metal Cells", Journal of The Electrochemical Society, 2019, vol. 166, No. 8, pp. A1291-A1299 (9 pages).

T. T. Beyene et al., "Concentrated Dual-Salt Electrolyte to Stabilize Li Metal and Increase Cycle Life of Anode Free Li-Metal Batteries", Journal of The Electrochemical Society, 2019, vol. 166, No. 8, pp. A1501-A1509 (9 pages).

International Search Report issued in International Application No. PCT/EP2021/056900, mailed Jun. 14, 2021 (4 pages).

Written Opinion issued in International Application No. PCT/EP2021/056900, mailed Jun. 14, 2021 (7 pages).

\* cited by examiner

ANODE-LESS LITHIUM ION BATTERY

CROSS-REFERENCE TO RELATED APPLICATIONS

This application claims priority to European patent application No. 20170844.3 filed on Apr. 22, 2020, and International Application No. PCT/EP2021/056900, the whole contents of these applications being incorporated herein by reference for all purposes.

TECHNICAL FIELD

The present invention relates to an anode-less lithium ion battery comprising a) a cathode comprising a cathode current collector and a cathode electro-active material on the cathode current collector; b) an anode current collector; c) a liquid electrolyte composition between the a) cathode and the b) anode current collector; and d) a separator, wherein the c) liquid electrolyte composition comprises i) at least 70% by volume (vol %) of a solvent mixture with respect to the total volume of the electrolyte composition, comprising at least one fluorinated ether compound and at least one non-fluorinated ether compound, and ii) at least one lithium salt.

BACKGROUND OF THE INVENTION

For more than two decades, lithium-ion batteries have retained a dominant position in the market of rechargeable energy storage devices due to their many benefits comprising light-weight, reasonable energy density, and good cycle life. Nevertheless, current lithium-ion batteries still suffer from relatively low energy densities with respect to the required energy density, which is increasing for high power applications such as electrical vehicles (EVs), hybrid electrical vehicles (HEVs), grid energy storage, etc.

In general, lithium-ion batteries have various components comprising an anode current collector, an anode material, an electrolyte, a separator, a cathode material, a cathode current collector and a housing. Since various components are used, lithium-ion batteries are manufactured through a large number of steps. An anode of a lithium-ion battery is generally formed by applying an electro-active material onto an anode current collector to produce an active material layer which may comprise an active material, conducting material, and a binder.

Employing lithium metal as the anode material has been known since the 1970s. Indeed, lithium metal has favorable characteristics thanks to its low redox potential and high specific capacity, i.e., about 3861 mAh g$^{-1}$. However, these cells have not achieved commercial success due to the following two main drawbacks:

First, lithium metal dendrites may form during the operation of the cell. They tend to accumulate in the cell, puncture the separator and cause an internal short-circuit, leading to heat and possibly fire or explosion.

Second, during the initial cycles, the solid electrolyte interface (SEI) layer forms on the anode surface, causing significant Coulombic efficiency losses, and an increase of the cell resistance. Although such low Coulombic efficiency may be partially compensated by having an excess amount of Li metal, the dendrite growth-related battery failures with high safety risk have been a big obstacle in the industry.

Accordingly, diverse research efforts have been engaged with a view of reducing or suppressing the lithium dendrite formation and improving the cycling performance of the cell.

The use of a solid polymer electrolyte has been considered in place of a liquid electrolyte. For example, S. Liu et al. in *Journal of Power Sources*, 195, 6847 (2010) describe a lithium electrochemical cell comprising a lithium ion conducting polymer electrolyte of polyethylene oxide PEO$_{18}$ with lithium trifluoromethane sulfonimide LiN(CF$_3$SO$_2$)$_2$ (LiTFSI). However, short-circuits have been observed even with such a solid polymer, although to a lesser extent than with a liquid electrolyte. Besides, no polymer electrolyte with high conductivity at room temperature has been reported yet.

Hydro-Quebec and 3M have recently developed lithium electrochemical cells comprising a polymer electrolyte, an anode made of a thin lithium foil and a cathode containing vanadium oxide as the electro-active material. However, accidents have been reported on these cells, which were probably caused by the formation of dendrites during the charging process.

The use of a solid electrolyte has also been considered instead of a liquid electrolyte. For example R. Sudo et al. describe in *Solid State Ionics*, 262, 151 (2014) the use of Al-doped Li$_7$La$_3$Zr$_2$O$_{12}$ as a solid electrolyte in an electrochemical cell comprising a lithium anode. However, lithium dendrites were again observed.

Many approaches to the prevention of lithium dendrite formation have focused on improving the stability and uniformity of the passivation layer on the anode. For example, D. Aurbach et al. in *Solid State Ionics*, 148, 405 (2002) and H. Ota et al. in *Electrochimica Acta*, 49, 565 (2004) report that additives such as CO$_2$, SO$_2$, and vinylene carbonate help in improving the stability of the passivation layer. However, these additives are consumed during the operation of the cell. Thus, they do not offer a long-term solution to the problem of dendrite formation.

There have been also some approaches consisting of modifying the composition of the liquid electrolyte.

For example, the use of a liquid electrolyte with a high lithium salt concentration of LiTFSI in dimethoxyethane (DME)-1,3dioxolane (DOL) (1:1 v:v) for suppressing lithium dendrite formation has been described by L. Suo et al. in *Nature Communications*, DOI:10.1038/ncomms2513 (2013).

The use of a liquid electrolyte with a high lithium salt concentration of lithium bis(fluorosulfonyl)imide LiN(FSO$_2$)$_2$ (LiFSI) in dimethoxyethane (DME)-1,3dioxolane (DOL) (1:1 v:v) for enabling high-rate cycling of a lithium metal electrode without dendrite growth has been described by J. Qian et al. in *Nature Communications*, DOI: 10.1038/ncomms7362 (2015).

H. Wang et al. report in *ChemElectroChem*, 2, 1144 (2015) that a cell containing lithium metal as the anode and a solvated ionic liquid of tetraglyme (G4) and LiFSI as the electrolyte exhibits excellent cycling performance.

Another approach to finding a remedy to the growth of lithium dendrites at the surface of the anode is an anode-less lithium ion battery. In an anode-free battery, the energy density may be significantly greater than that of conventional lithium-ion batteries, even in consideration of the thickness increase of the anode due to the lithium plating made via charging.

In this regard, in addition to the structural differences, the main differences between a lithium metal battery and an anode-less battery include the following:

i) the charge/discharge mechanisms in an anode-free battery are totally different from conventional rechargeable batteries due to the absence of anode. For an anode-less battery, despite neither lithium foil nor other anodes are used, lithium is absolutely necessary for cathode because the lithium metal on anode current collector is obtained from lithium transition metal oxides, e.g., $LiCoO_2$, NCMs ($LiNi_xCo_yMn_zO_2$), etc. More specifically, lithium ions extracted from the cathode electrolyte soaked separator are electroplated onto the surface of an anode current collector, forming a deposited lithium together with an electrochemically stable solid electrolyte interphase (SEI) during the charging process. The deposited lithium is the only available lithium sources for discharge. From this reason, the safety hazard often posed in the lithium metal battery is greatly reduced because there is no active lithium source at the anode side; and ii) the kinetic of the electrochemical process of an anode-less battery is different from a lithium battery. That is, in an anode-less battery, lithium is directly plated on the bare surface of an anode current collector from cathode in its first charging, while for a lithium metal battery, lithium is deposited on lithium foil which easily leads to the dendrite growth. Moreover, the side reaction with conventional liquid electrolytes is getting much more severe. This finally brings an anode swelling via repeated breaking and repairing the SEI layers, that hinders industrialization.

For now, such an anode-free cell uses conventional liquid electrolytes such as a carbonate-based electrolyte or an ether-based electrolyte having a low viscosity and a high ionic conductivity. These liquid electrolytes decompose to make a passivation layer at the beginning of the cycles, which will result in the dendrite growth, and also further side reactions between the electrolyte and the deposited reactive lithium-ions. This has been one of the critical issues to block the commercialization of the anode-free cells. Accordingly, despite various advantages of an anode-less battery, those challenges resulting from the fundamental issues in lithium plating/stripping processes have forced the persons skilled in the field to investigate more diverse strategies including new designs in an anode current collector with low overpotential and uniform electric field, and the engineering of SEI layer by optimizing electrolytes to induce the formation of stable and robust SEI layer through the selection of the proper solvents, additives, salts, etc. in optimal concentrations. In other words, even though after the initial charge process, an anode-less battery operates as a lithium metal battery, it doesn't mean that the whole cell structure, the working mechanisms, and the optimal electrolytes for a lithium metal battery are identical to those for an anode-less battery. Thus, there remains a need for an anode-free lithium ion battery having improved cell performance, while minimizing the dendrite growth and the side reactions between the liquid electrolyte and lithium plated anode, and also for an liquid electrolyte which may mitigate such drawbacks while maintaining good cell performance of an anode-less battery.

SUMMARY OF THE INVENTION

The present invention relates to an anode-less lithium ion battery comprising:
a) a cathode comprising a cathode current collector and a cathode electro-active material on the cathode current collector;
b) an anode current collector;
c) a liquid electrolyte composition between the a) cathode and the b) anode current collector; and
d) a separator, wherein the c) liquid electrolyte composition comprises i) at least 70% by volume (vol %) of a solvent mixture with respect to the total volume of the electrolyte composition, comprising at least one fluorinated ether compound and at least one non-fluorinated ether compound, and ii) at least one lithium salt.

It was surprisingly found by the inventors that the above-mentioned technical problems can be solved by using a liquid electrolyte composition according to the present invention within an anode-less lithium ion battery.

BRIEF DESCRIPTION OF DROWNINGS

DETAILED DESCRIPTION OF THE INVENTION

Definitions

Figure 1:
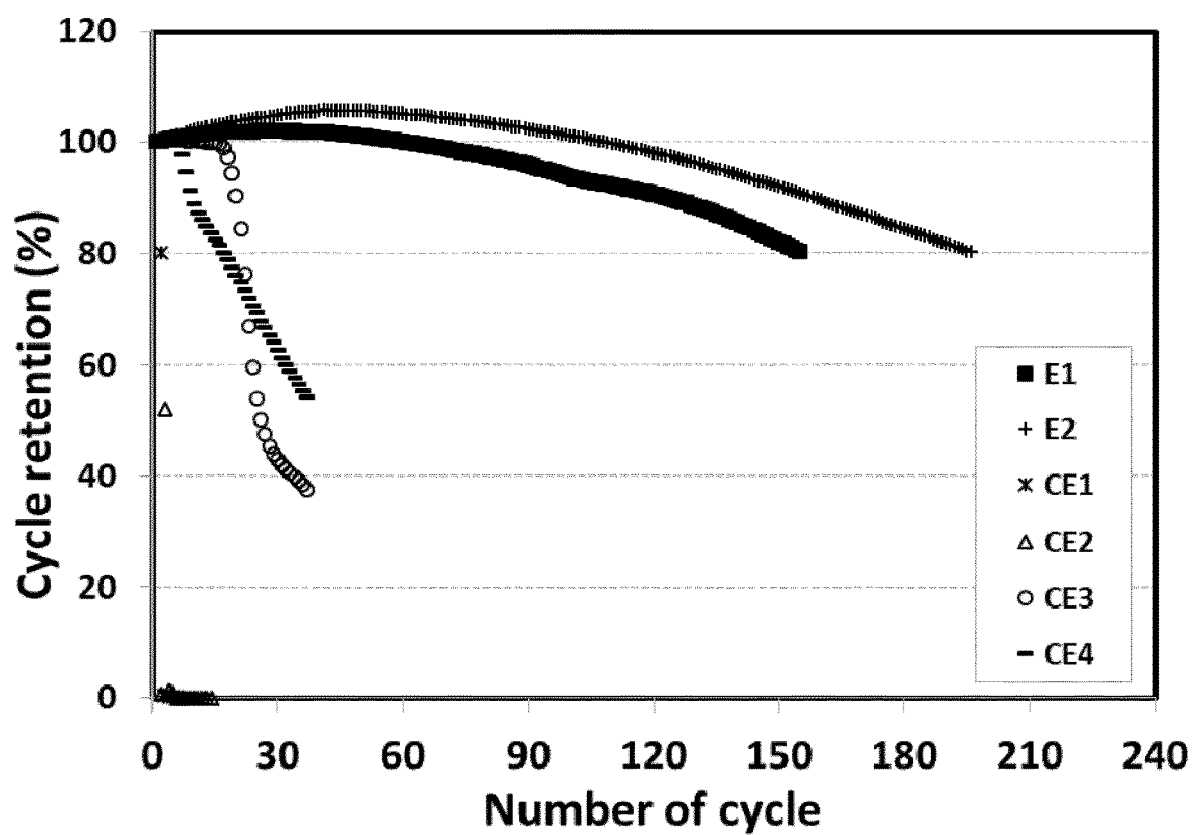
FIG. 1 shows cycle retention (%) of NCM523/Cu cells with electrolyte compositions of E1-E2 and CE1-CE4 at 3.6~4.2V (0.2 C/0.5 C).

Throughout this specification, unless the context requires otherwise, the word "comprise" or "include", or variations such as "comprises", "comprising", "includes", including" will be understood to imply the inclusion of a stated element or method step or group of elements or method steps, but not the exclusion of any other element or method step or group of elements or method steps. According to preferred embodiments, the word "comprise" and "include", and their variations mean "consist exclusively of".

As used in this specification, the singular forms "a", "an" and "the" include plural aspects unless the context clearly dictates otherwise. The term "and/or" includes the meanings "and", "or" and also all the other possible combinations of the elements connected to this term.

The term "between" should be understood as being inclusive of the limits.

As used herein, "alkyl" groups include saturated hydrocarbons having one or more carbon atoms, including straight-chain alkyl groups, such as methyl, ethyl, propyl, butyl, pentyl, hexyl, heptyl, octyl, nonyl, decyl, cyclic alkyl groups (or "cycloalkyl" or "alicyclic" or "carbocyclic" groups), such as cyclopropyl, cyclopentyl, cyclohexyl, cycloheptyl, and cyclooctyl, branched-chain alkyl groups, such as isopropyl, tert-butyl, sec-butyl, and isobutyl, and alkyl-substituted alkyl groups, such as alkyl-substituted cycloalkyl groups and cycloalkyl-substituted alkyl groups.

The term "aliphatic group" includes organic moieties characterized by straight or branched-chains, typically having between 1 and 18 carbon atoms. In complex structures, the chains may be branched, bridged, or cross-linked. Aliphatic groups include alkyl groups, alkenyl groups, and alkynyl groups.

As used herein, the terminology "($C_n$–$C_m$)" in reference to an organic group, wherein n and m are integers, respectively, indicates that the group may contain from n carbon atoms to m carbon atoms per group.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature range of about 120° C. to about 150° C. should be interpreted to include not only the explicitly recited limits of about 120° C. to about 150° C., but also to include sub-ranges, such as 125° C. to 145° C., 130° C. to 150° C., and so forth, as well as individual amounts, including fractional amounts, within the specified ranges, such as 122.2° C., 140.6° C., and 141.3° C., for example.

Unless otherwise specified, in the context of the present invention the amount of a component in a composition is indicated as the ratio between the volume of the component and the total volume of the composition multiplied by 100, i.e., % by volume (vol %) or as the ratio between the weight of the component and the total weight of the composition multiplied by 100, i.e., % by weight (wt %).

The constituents of the anode-less lithium ion battery comprising a) a cathode comprising a cathode current collector and a cathode electro-active material on the cathode current collector; b) an anode current collector; c) a liquid electrolyte composition; and d) a separator according to the present invention are described hereinafter in details. It is to be understood that both the foregoing general description and the following detailed description are exemplary and are intended to provide further explanation of the invention as claimed. Accordingly, various changes and modifications described herein will be apparent to those skilled in the art. Moreover, descriptions of well-known functions and constructions may be omitted for clarity and conciseness.

The present invention relates to an anode-less lithium ion battery comprising:
 a) a cathode comprising a cathode current collector and a cathode electro-active material on the cathode current collector;
 b) an anode current collector;
 c) a liquid electrolyte composition between the a) cathode and the b) anode current collector; and
 d) a separator,
 wherein the c) liquid electrolyte composition comprises i) at least 70% by volume (vol %) of a solvent mixture with respect to the total volume of the electrolyte composition, comprising at least one fluorinated ether compound and at least one non-fluorinated ether compound, and ii) at least one lithium salt.

In one embodiment, the solvent mixture according to the present invention comprises
 from 60 to 90 vol % of at least one fluorinated ether compound; and
 from 10 to 40 vol % of at least one non-fluorinated ether compound, with respect to the total volume of the solvent mixture.

In another embodiment, the solvent mixture according to the present invention comprises
 from 80 to 90 vol % of at least one fluorinated ether compound; and
 from 10 to 20 vol % of at least one non-fluorinated ether compound, with respect to the total volume of the solvent mixture.

In one embodiment, the solvent mixture according to the present invention is free from an organic carbonate.

Non-limiting examples of the organic carbonate include, notably, ethylene carbonate (1,3-dioxolan-2-one), propylene carbonate, 4-methylene-1,3-dioxolan-2-one, 4,5-dimethylene-1,3-dioxolan-2-one, dimethyl carbonate, diethyl carbonate, ethyl methyl carbonate, dipropyl carbonate, methyl propyl carbonate, methyl butyl carbonate, ethyl propyl carbonate, ethyl butyl carbonate, propyl butyl carbonate, dibutyl carbonate, di-tert-butyl carbonate, butylene carbonate, mono- and difluorinated propylene carbonate, mono- and difluorinated butylene carbonate, 3,3,3-trifluoropropylene carbonate, fluorinated dimethyl carbonate, fluorinated diethyl carbonate, fluorinated ethyl methyl carbonate, fluorinated dipropyl carbonate, fluorinated dibutyl carbonate, fluorinated methyl propyl carbonate, and fluorinated ethyl propyl carbonate.

In the present invention, the term "fluorinated ether compound" is intended to denote an ether compound, wherein at least one hydrogen atom is replaced by fluorine. One, two, three or a higher number of hydrogen atoms may be replaced by fluorine.

In the present invention, the fluorinated ether compound comprises fluorinated mono-ether compounds, fluorinated di-ether compounds and fluorinated tri-ether compounds.

In one embodiment, the fluorinated ether compound according to the present invention is an aliphatic compound.

In one embodiment, the fluorinated ether compound has a chemical formula of $C_aF_bH_cO_d$, wherein a, b, c and d are all integers, d is an integer from 1 to 3, a is an integer from 3 to 10, preferably from 4 to 7, and $2*(a+1)=b+c$.

In a preferred embodiment, the fluorinated ether compound is selected from the group consisting of:
 i) 1,1,2,2-tetrafluoroethyl-2,2,3,3-tetrafluoropropyl ether (TTE), 1,1,3,3-tetrafluoro-1-(1,1,2,2-tetrafluoroethoxy) propane, 1,1,1,3,3-pentafluoro-3-(2,2,2-trifluoroethoxy) propane, 1,1,1,3,3-pentafluoro-3-(1,1,3,3,3-pentafluoropropoxy)propane, 1,1'-oxybis(1,1,2,2-tetrafluoroethane), 1,1,1,3,3-pentafluoro-3-methoxy-2-(trifluoromethyl) propane, 1,1,1,3,3-pentafluoro-3-(fluoromethoxy)-2-(trifluoromethyl)propane, 2,2-difluoro-2-methoxy-1,1-bis(trifluoromethyl)ethane, 2-(ethoxy difluoromethyl)-1,1,1,3,3,3-hexafluoropropane, 2-(difluoropropoxy methyl)-1,1,1,3,3,3-hexafluoropropane, 1,1-bis(difluoromethoxy)-1,2,2,2-tetrafluoroethane, 1,1,2,2-tetrafluoro-3-(1,1,2,2-tetrafluoroethoxy) propane, 1-(2,2-difluoroethoxy)-1,1,2,3,3,3-hexafluoropropane, 1,1,2,2,3-pentafluoro-3-(1,1,2,2-tetrafluoroethoxy)propane, 1-(3,3-difluoropropoxy)-1,1,2,3,3,3-hexafluoropropane, 1-[difluoro(1,1,2,2-tetrafluoroethoxy)methoxy]-1,1,2,2,2-pentafluoroethane, 1,1'-[(difluoromethylene)bis(oxy)]bis(1,1,2,2,2-pentafluoroethane), 1,1,1,3,3,3-hexafluoro-2-fluoromethoxymethoxy propane, pentafluoro[1,2,2,2-tetrafluoro (trifluoromethoxy) ethoxy]ethane, 1,1,2,3,3-pentafluoro-1,3-dimethoxypropane, 1,1,2,2,3,3-hexafluoro-1-methoxy-3-trifluoromethoxypropane, 1,1'-[(difluoromethylene)bis(oxy)]-bis(2,2,2-trifluoroethane), 1,2-bis(difluoromethoxy)-1,1,2,2-tetrafluoroethane, [2-(difluoromethoxy)-1,1,2,2-tetrafluoroethoxy] difluoromethane, 1-[difluoro(trifluoromethoxy) methoxy]-1,1,2,2-tetrafluoro-2-methoxyethane, 1-(difluoromethoxymethoxy)-1,1,2,2-tetrafluoro-2-(trifluoromethoxy)ethane, 1-[(difluoromethoxy) difluoromethoxy]-1,1,2,2-tetrafluoro-2-methoxyethane, and 1-(difluoromethoxy)-2-[(difluoromethoxy)difluoromethoxy]-1,1,2,2-tetrafluoroethane;

ii) chemical compounds represented by the general formula (A),

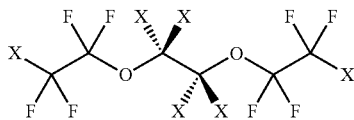

wherein X is H or F; and
iii) mixtures thereof.

In a more preferred embodiment, the fluorinated ether compound comprises 1,1,2,2-tetrafluoroethyl-2,2,3,3-tetrafluoropropyl ether (TTE) and $CF_2HCF_2$—$OCH_2CH_2O$—$CF_2CF_2H$.

In the present invention, the term "non-fluorinated ether compound" is intended to denote an ether compound, wherein no fluorine atom is present.

Non-limitative examples of suitable non-fluorinated ether compounds according to the present invention include, notably, the followings:

aliphatic, cycloaliphatic or aromatic ether, more particularly, dibutyl ether, dipentyl ether, diisopentyl ether, dimethoxyethane (DME), 1,3-dioxolane (DOL), tetrahydrofuran (THF), 2-methyltetrahydrofuran, and diphenyl ether;

glycol ethers, such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether, ethylene glycol dimethyl ether, diethylene glycol dimethyl ether (DEGME), ethylene glycol diethyl ether, diethylene glycol diethyl ether (DEGDEE), tetraethylene glycol dimethyl ether (TEGME), polyethylene glycol dimethyl ether (PEGDME);

glycol ether esters, such as ethylene glycol methyl ether acetate, ethylene glycol monoethyl ether acetate, ethylene glycol monobutyl ether acetate;

In a preferred embodiment, the non-fluorinated ether compound according to the present invention comprises dimethoxyethane (DME), 1,3-dioxolane (DOL), dibutyl ether, tetraethylene glycol dimethyl ether (TEGME), diethylene glycol dimethyl ether (DEGME), diethylene glycol diethyl ether (DEGDEE), polyethylene glycol dimethyl ether (PEGDME), 2-methyltetrahydrofuran and tetrahydrofuran (THF).

In a more preferred embodiment, the non-fluorinated ether compound is a mixture of DME and DOL.

In a more preferred embodiment, the non-fluorinated ether compound is DME.

In the present invention, the term "anode-less lithium ion battery" is intended to denote, in particular, the lithium ion battery which does not include an anode electro-active material on the anode current collector when the battery is assembled and before the first charge. After the first charge, the anode-less lithium ion battery comprises either a lithium metal thin layer or a lithium alloy thin layer on the anode current collector. That is, while the anode-less lithium ion battery has a negative electrode, the term "anode-less" is used because when manufactured a distinct anode electro-active material is not present in the lithium ion battery.

In the present invention, the term "anode" is intended to denote, in particular, the electrode of an electrochemical cell, where oxidation occurs during discharging.

In the present invention, the term "cathode" is intended to denote, in particular, the electrode of an electrochemical cell, where reduction occurs during discharging.

In the present invention, the nature of the "current collector" depends on whether the electrode thereby provided is either a cathode or anode. Should the electrode of the invention be a cathode, the current collector typically comprises, preferably consists of at least one metal selected from the group consisting of Aluminium (Al), Nickel (Ni), Titanium (Ti), and alloys thereof, preferably Al. Should the electrode of the invention be an anode, the current collector typically comprises, preferably consists of at least one metal selected from the group consisting of Lithium (Li), Sodium (Na), Zinc (Zn), Magnesium (Mg), Copper (Cu) and alloys thereof, preferably Cu.

In the present invention, the term "electro-active material" is intended to denote an electro-active material that is able to incorporate or insert into its structure and substantially release therefrom lithium ions during the charging phase and the discharging phase of a battery.

In the case of forming a cathode for an anode-less lithium ion battery, the cathode electro-active material is not particularly limited. It may comprise a composite metal chalcogenide of formula $LiMQ_2$, wherein M is at least one metal selected from transition metals such as Co, Ni, Fe, Mn, Cr, and V and Q is a chalcogen such as 0 or S. Among these, it is preferred to use a lithium-based composite metal oxide of formula $LiMO_2$, wherein M is the same as defined above. Preferred examples thereof may include $LiCoO_2$, $LiNiO_2$, $LiNi_xCo_{1-x}O_2$ (0<x<1), and spinel-structured $LiMn_2O_4$. Another preferred examples thereof may include lithium-nickel-manganese-cobalt-based metal oxide of formula $LiNi_xMn_yCo_zO_2$ (x+y+z=1, referred to as NMC), for instance $LiNi_{1/3}Mn_{1/3}Co_{1/3}O_2$, $LiNi_{0.6}Mn_{0.2}Co_{0.2}O_2$, and lithium-nickel-cobalt-aluminum-based metal oxide of formula $LiNi_xCo_yAl_zO_2$ (x+y+z=1, referred to as NCA), for instance $LiNi_{0.8}Co_{0.15}Al_{0.05}O_2$.

As an alternative, still in the case of forming a cathode for an anode-less lithium ion battery, the cathode electro-active compound may comprise a lithiated or partially lithiated transition metal oxyanion-based electro-active material of formula $M_1M_2(JO_4)_fE_{1-f}$, wherein $M_1$ is lithium, which may be partially substituted by another alkali metal representing less that 20% of the $M_1$ metals, $M_2$ is a transition metal at the oxidation level of +2 selected from Fe, Mn, Ni or mixtures thereof, which may be partially substituted by one or more additional metals at oxidation levels between +1 and +5 and representing less than 35% of the $M_2$ metals, including 0, $JO_4$ is any oxyanion wherein J is either P, S, V, Si, Nb, Mo or a combination thereof, E is a fluoride, hydroxide or chloride anion, f is the molar fraction of the $JO_4$ oxyanion, generally comprised between 0.75 and 1.

The $M_1M_2(JO_4)_fE_{1-f}$ electro-active material as defined above is preferably phosphate-based and may have an ordered or modified olivine structure.

More preferably, the cathode electro-active material has formula $Li_{3-x}M'_yM''_{2-y}(JO_4)_3$ wherein 0≤x≤3, 0≤y≤2, M' and M" are the same or different metals, at least one of which being a transition metal, $JO_4$ is preferably $PO_4$ which may be partially substituted with another oxyanion, wherein J is either S, V, Si, Nb, Mo or a combination thereof. Still more preferably, the electro-active material is a phosphate-based electro-active material of formula $Li(Fe_xMn_{1-x})PO_4$ wherein $0 \leq x \leq 1$, wherein x is preferably 1 (that is to say, lithium iron phosphate of formula LiFePO$_4$).

In a preferred embodiment, the cathode electro-active material is selected from the group consisting of LiMQ$_2$, wherein M is at least one metal selected from Co, Ni, Fe, Mn, Cr and V and Q is O or S; LiNi$_x$Co$_{1-x}$O$_2$ (0<x<1); spinel-structured LiMn$_2$O$_4$; lithium-nickel-manganese-cobalt-based metal oxide of formula LiNi$_x$Mn$_y$Co$_z$O$_2$ (x+y+z=1), lithium-nickel-cobalt-aluminum-based metal oxide of formula LiNi$_x$Co$_y$Al$_z$O$_2$ (x+y+z=1), and LiFePO$_4$.

In one embodiment, at least one electro-active compound according to the present invention is loaded onto the cathode current collector to have an areal capacity between 1.0 mAh/cm$^2$ and 10.0 mAh/cm$^2$, preferably between 3.0 mAh/cm$^2$ and 8.0 mAh/cm$^2$ and more preferably between 4.0 mAh/cm$^2$ and 7.0 mAh/cm$^2$.

In the present invention, the expression "thickness of the cathode" is intended to denote a total combined thickness of the cathode current collector and the cathode electro-active material layer.

In one embodiment, the thickness of the cathode according to the present invention is between 40 μm and 150 μm, preferably between 50 μm and 120 μm, and more preferably between 60 μm and 100 μm.

In the present invention, the lithium salt is selected from the group consisting of
a) LiN(SO$_2$F)$_2$ (lithium bis(fluorosulfonyl)imide: LiFSI), LiN(CF$_3$SO$_2$)$_2$ (lithium bis(trifluoromethanesulfonyl) imide: LiTFSI), LiPF$_6$, LiBF$_4$, LiClO$_4$, Li bis(oxalato) borate (LiBOB), LiCF$_3$SO$_3$, LiF, LiCl, LiBr, LiI, LiN (C$_2$F$_5$SO$_2$)$_2$, LiN(CF$_3$SO$_2$)(R$_F$SO$_2$), wherein R$_F$ is C$_2$F$_5$, C$_4$F$_9$ or CF$_3$OCF$_2$CF$_2$, LiAsF$_6$, LiC(CF$_3$SO$_2$)$_3$, Li$_2$S;

b) 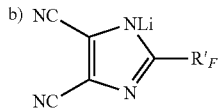

wherein R'$_F$ is selected from the group consisting of F, CF$_3$, CHF$_2$, CH$_2$F, C$_2$HF$_4$, C$_2$H$_2$F$_3$, C$_2$H$_3$F$_2$, C$_2$F$_5$, C$_3$F$_7$, C$_3$H$_2$F$_5$, C$_3$H$_4$F$_3$, C$_4$F$_9$, C$_4$H$_2$F$_7$, C$_4$H$_4$F$_5$, C$_5$F$_{11}$, C$_3$F$_{50}$CF$_3$, C$_2$F$_{40}$CF$_3$, C$_2$H$_2$F$_2$OCF$_3$ and CF$_2$OCF$_3$; and
c) combinations thereof.

In a preferred embodiment, the lithium salt is LiFSI.

In one embodiment, a molar concentration (M) of the lithium salt in the liquid electrolyte composition according to the present invention is from 1 M to 8 M, preferably from 1 M to 3 M, and more preferably from 1 M to 2 M.

By the term "separator", it is hereby intended to denote a monolayer or multilayer polymeric, nonwoven cellulose or ceramic material/film, which electrically and physically separates the electrodes of opposite polarities in an electrochemical device and is permeable to ions flowing between them.

In the present invention, the separator can be any porous substrate commonly used for a separator in an electrochemical device.

In one embodiment, the separator is a porous polymeric material comprising at least one material selected from the group consisting of polyester such as polyethylene terephthalate and polybutylene terephthalate, polyphenylene sulphide, polyacetal, polyamide, polycarbonate, polyimide, polyether sulfone, polyphenylene oxide, polyphenylene sulfide, polyethylene naphthalene, polyethylene oxide, polyacrylonitrile, polyolefin such as polyethylene and polypropylene, or mixtures thereof.

In a particular embodiment, the separator is a porous polymeric material coated with inorganic nanoparticles, for instance, SiO$_2$, TiO$_2$, Al$_2$O$_3$, ZrO$_2$, etc.

In another particular embodiment, the separator is a porous polymeric material coated with polyvinylidene difluoride (PVDF).

According to one embodiment, the c) liquid electrolyte composition further comprises at least one additive, in particular a film-forming additive, which promotes the formation of the solid electrolyte interface (SEI) layer at the anode surface and/or cathode surface by reacting in advance of the solvents on the electrode surfaces. The main components of SEI hence comprise the decomposed products of electrolyte solvents and salts, which include Li$_2$CO$_3$, lithium alkyl carbonate, lithium alkyl oxide and other salt moieties such as LiF for LiPF$_6$-based electrolytes. Usually, the reduction potential of the film-forming additive is higher than that of the solvent when reaction occurs at the anode surface, and the oxidation potential of the film-forming additive is lower than that of the solvent when the reaction occurs at the cathode side.

In one embodiment, the film-forming additive according to the present invention is an ionic liquid.

The term "ionic liquid" as used herein refers to a compound comprising a positively charged cation and a negatively charged anion, which is in the liquid state at the temperature of 100° C. or less under atmospheric pressure. While ordinary liquids such as water are predominantly made of electrically neutral molecules, ionic liquids are largely made of ions and short-lived ion pairs. As used herein, the term "ionic liquid" indicates a compound free from solvent.

The term "onium cation" as used herein refers to a positively charged ion having at least part of its charge localized on at least one non-metal atom such as O, N, S, or P.

In the present invention, the ionic liquid has a general formula of A$^{n-}$Q$^{l+}_{(n/l)}$, wherein A$^{n-}$ represents an anion;

Q$^{l+}_{(n/l)}$ represents a cation;

n and l, independently selected between 1 and 5, represent respectively the charges of the anion A$^{n-}$ and of the cation Q$^{l+}_{(n/l)}$.

The cation(s) may be selected, independently of one another, from metal cations and organic cations. The cation (s) may be mono-charged cations or polycharged cations.

As metal cation, mention may preferably be made of alkali metal cations, alkaline-earth metal cations and cations of d-block elements.

In the present invention, Q$^{l+}_{(n/l)}$ may represent an onium cation. Onium cations are cations formed by the elements of Groups VB and VIB (as defined by the old European IUPAC system according to the Periodic Table of the Elements) with three or four hydrocarbon chains. The Group VB comprises the N, P, As, Sb and Bi atoms. The Group VIB comprises the O, S, Se, Te and Po atoms. The onium cation can in particular be a cation formed by an atom selected from the group consisting of N, P, O and S, more preferably N and P, with three or four hydrocarbon chains.

The onium cation $Q^{i+}_{(n/I)}$ can be selected from:

heterocyclic onium cations; in particular those selected from the group consisting of:

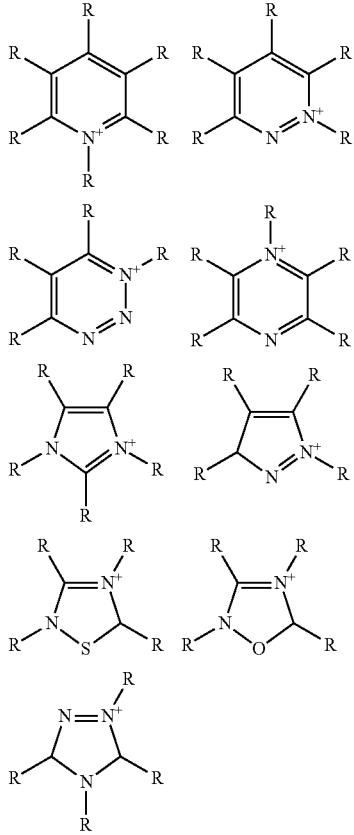

unsaturated cyclic onium cations; in particular those selected from the group consisting of:

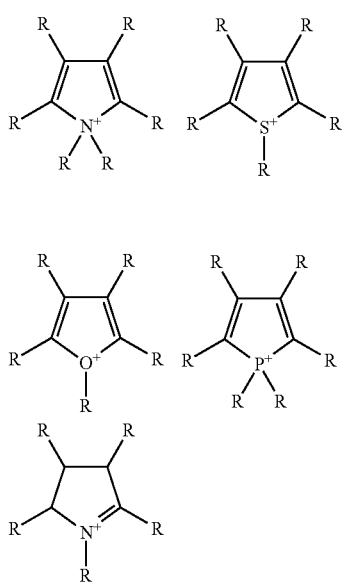

saturated cyclic onium cations; in particular those selected from the group consisting of:

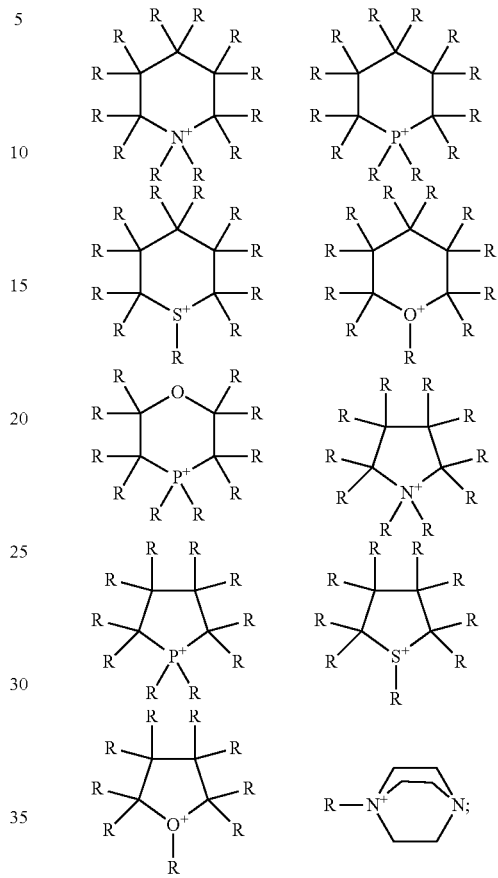

and non-cyclic onium cations; in particular those of general formula $^+L\text{-}R'_s$, in which L represents an atom selected from the group consisting of N, P, O and S, more preferably N and P, s represents the number of R' groups selected from 2, 3 or 4 according to the valence of the element L, each R' independently represents a hydrogen atom or a $C_1$ to $C_8$ alkyl group, and the bond between $L^+$ and R' can be a single bond or a double bond.

In the above formulas, each "R" symbol represents, independently of one another, a hydrogen atom or an organic group. Preferably, each "R" symbol can represent, in the above formulas, independently of one another, a hydrogen atom or a saturated or unsaturated and linear, branched or cyclic $C_1$ to $C_{18}$ hydrocarbon group optionally substituted one or more times by a halogen atom, an amino group, an imino group, an amide group, an ether group, an ester group, a hydroxyl group, a carboxyl group, a carbamoyl group, a cyano group, a sulfone group or a sulfite group.

The cation $Q^{i+}_{(n/I)}$ can more particularly be selected from ammonium, phosphonium, pyridinium, pyrrolidinium, pyrazolinium, imidazolium, arsenium, quaternary phosphonium and quaternary ammonium cations.

The quaternary phosphonium or quaternary ammonium cations can more preferably be selected from tetraalkylammonium or tetraalkylphosphonium cations, trialkylbenzylammonium or trialkylbenzylphosphonium cations or tetraarylammonium or tetraarylphosphonium cations, the alkyl groups of which, either identical or different, represents a linear or branched alkyl chain having from 4 to 12 carbon atoms, preferably from 4 to 6 carbon atoms, and the aryl groups of which, either identical or different, represents a phenyl or naphthyl group.

In a specific embodiment, $Q^{l+}_{(n/l)}$ represents a quaternary phosphonium or quaternary ammonium cation.

In one preferred embodiment, $Q^{l+}_{(n/l)}$ represents a quaternary phosphonium cation. Non-limiting examples of the quaternary phosphonium cation comprise trihexyl(tetradecyl)phosphonium, and a tetraalkylphosphonium cation, particularly the tetrabutylphosphonium ($PBu_4$) cation.

In another embodiment, $Q^{l+}_{(n/l)}$ represents an imidazolium cation. Non-limiting examples of the imidazolium cation comprise 1,3-dimethylimidazolium, 1-(4-sulfobutyl)-3-methyl imidazolium, 1-allyl-3H-imidazolium, 1-butyl-3-methylimidazolium, 1-ethyl-3-methylimidazolium, 1-hexyl-3-methylimidazolium, 1-octyl-3-methylimidazolium In another embodiment, $Q^{l+}_{(n/l)}$ represents a quaternary ammonium cation which is selected in particular from the group consisting of tetraethylammonium, tetrapropylammonium, tetrabutylammonium, trimethylbenzylammonium, methyltributylammonium, N,N-diethyl-N-methyl-N-(2-methoxyethyl) ammonium, N,N-dimethyl-N-ethyl-N-(3-methoxypropyl) ammonium, N,N-dimethyl-N-ethyl-N-benzyl ammonium, N, N-dimethyl-N-ethyl-N-phenylethyl ammonium, N-tributyl-N-methyl ammonium, N-trimethyl-N-butyl ammonium, N-trimethyl-N-hexyl ammonium, N-trimethyl-N-propyl ammonium, and Aliquat 336 (mixture of methyltri($C_8$ to $C_{10}$ alkyl)ammonium compounds).

In one embodiment, $Q^{l+}_{(n/l)}$ represents a piperidinium cation, in particular N-butyl-N-methyl piperidinium, N-propyl-N-methyl piperidinium.

In another embodiment, $Q^{l+}_{(n/l)}$ represents a pyridinium cation, in particular N-methylpyridinium.

In a more preferred embodiment, $Q^{l+(n/l)}$ represents a pyrrolidinium cation. Among specific pyrrolidinium cations, mention may be made of the following: $C_{1-12}$alkyl-$C_{1-12}$alkyl-pyrrolidinium, and more preferably $C_{1-4}$alkyl-$C_{1-4}$alkyl-pyrrolidinium. Examples of pyrrolidinium cations comprise, but not limited to, N,N-dimethylpyrrolidinium, N-ethyl-N-methylpyrrolidinium, N-isopropyl-N-methylpyrrolidinium, N-methyl-N-propylpyrrolidinium, N-butyl-N-methylpyrrolidinium, N-octyl-N-methylpyrrolidinium, N-benzyl-N-methylpyrrolidinium, N-cyclohexylmethyl-N-methylpyrrolidinium, N-[(2-hydroxy)ethyl]-N-methylpyrrolidinium. More preferred are N-methyl-N-propylpyrrolidinium (PYR13) and N-butyl-N-methylpyrrolidinium (PYR14).

Non-limiting examples of an anion of the ionic liquid comprise iodide, bromide, chloride, hydrogen sulfate, dicyanamide, acetate, diethyl phosphate, methyl phosphonate, fluorinated anion, e.g., hexafluorophosphate ($PF_6^-$) and tetrafluoroborate ($BF_4^-$), and oxalatooborate of the following formula:

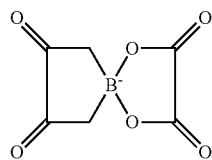 [SMILES: O=C1C[B-]2(CC1=O)OC(=O)C(=O)O2]

In one embodiment, $A^{n-}$ is a fluorinated anion. Among the fluorinated anions that can be used in the present invention, fluorinated sulfonimide anions may be particularly advantageous. The organic anion may, in particular, be selected from the anions having the following general formula:

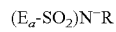

in which:

$E_a$ represents a fluorine atom or a group having preferably from 1 to 10 carbon atoms, selected from fluoroalkyls, perfluoroalkyls and fluoroalkenyls, and R represents a substituent.

Preferably, $E_a$ may represent F or $CF_3$.

According to a first embodiment, R represents a hydrogen atom.

According to a second embodiment, R represents a linear or branched, cyclic or non-cyclic hydrocarbon-based group, preferably having from 1 to 10 carbon atoms, which can optionally bear one or more unsaturations, and which is optionally substituted one or more times with a halogen atom, a nitrile function, or an alkyl group optionally substituted one of several times by a halogen atom.

Moreover, R may represent a nitrile group —CN.

According to a third embodiment, R represents a sulfinate group. In particular, R may represent the group —$SO_2$-$E_a$, $E_a$ being as defined above. In this case, the fluorinated anion may be symmetrical, i.e. such that the two $E_a$ groups of the anion are identical, or non-symmetrical, i.e. such that the two $E_a$ groups of the anion are different.

Moreover, R may represent the group —$SO_2$—R', R' representing a linear or branched, cyclic or non-cyclic hydrocarbon-based group, preferably having from 1 to 10 carbon atoms, which can optionally bear one or more unsaturations, and which is optionally substituted one or more times with a halogen atom, a nitrile function, or an alkyl group optionally substituted one of several times by a halogen atom. In particular, R' may comprise a vinyl or allyl group. Furthermore, R may represent the group —$SO_2$—N—R', R' being as defined above or else R' represents a sulfonate function —$SO_3$.

Cyclic hydrocarbon-based groups may preferably refer to a cycloalkyl group or to an aryl group. "Cycloalkyl" refers to a monocyclic hydrocarbon chain, having 3 to 8 carbon atoms. Preferred examples of cycloalkyl groups are cyclopentyl and cyclohexyl. "Aryl" refers to a monocyclic or polycyclic aromatic hydrocarbon group, having 6 to 20 carbon atoms. Preferred examples of aryl groups are phenyl and naphthyl. When a group is a polycyclic group, the rings may be condensed or attached by σ (sigma) bonds.

According to a fourth embodiment, R represents a carbonyl group. R may, in particular, be represented by the formula —CO—R', R' being as defined above.

The organic anion that can be used in the present invention may advantageously be selected from the group consisting of $CF_3SO_2N^-SO_2CF_3$ (bis(trifluoromethane sulfonyl)imide anion, commonly denoted as TFSI), $FSO_2N^-SO_2F$ (bis(fluorosulfonyl)imide anion, commonly denoted as FSI), $CF_3SO_2N^-SO_2F$, and $CF_3SO_2N^-SO_2N^-SO_2CF_3$.

In a preferred embodiment, the ionic liquid contains:
a positively charged cation selected from the group consisting of imidazolinium, pyridinium, pyrrolidinium and piperidinium ions optionally containing one or more $C_1$-$C_{30}$ alkyl groups, and
a negatively charged anion selected from the group consisting of halides, fluorinated anions, and borates.

Non-limiting examples of $C_1$-$C_{30}$ alkyl groups include, notably, methyl, ethyl, propyl, iso-propyl, n-butyl, isobutyl, sec-butyl, t-butyl, pentyl, isopentyl, 2,2-dimethyl-propyl, hexyl, 2,3-dimethyl-2-butyl, heptyl, 2,2-dimethyl-3-pentyl, 2-methyl-2-hexyl, octyl, 4-methyl-3-heptyl, nonyl, decyl, undecyl and dodecyl groups.

In one preferred embodiment, the film-forming additive according to the present invention is selected from the group consisting of N-methyl-N-propylpyrrolidinium bis(fluorosulfonyl) imide (PYR13FSI), N-butyl-N-methylpyrrolidinium bis(fluorosulfonyl) imide (PYR14FSI), N-methyl-N-propylpyrrolidinium bis(trifluoromethanesulfonyl) imide (PYR13TFSI), and N-butyl-N-methylpyrrolidinium bis(trifluoromethanesulfonyl) imide (PYR14TFSI).

In another embodiment, the film-forming additive according to the present invention is selected from the group consisting of cyclic sulfite and sulfate compounds comprising 1,3-propanesultone (PS), ethylene sulfite (ES) and prop-1-ene-1,3-sultone (PES); sulfone derivatives comprising dimethyl sulfone, tetramethylene sulfone (also known as sulfolane), ethyl methyl sulfone and isopropyl methyl sulfone; nitrile derivatives comprising succinonitrile, adiponitrile, and glutaronitrile; lithium nitrate ($LiNO_3$); boron derivatives salt comprising lithium difluoro oxalato borate (LiDFOB), lithium fluoromalonato (difluoro)borate (LiFMDFB), vinyl acetate, biphenyl benzene, isopropyl benzene, hexafluorobenzene, tris(trimethylsilyl)phosphate, triphenyl phosphine, ethyl diphenylphosphinite, triethyl phosphite, tris(2,2,2-trifluoroethyl) phosphite, maleic anhydride, vinylene carbonate, vinyl ethylene carbonate, monofluorinated ethylene carbonate (4-fluoro-1,3-dioxolan-2-one), difluorinated ethylene carbonate, cesium bis(trifluorosulfonyl)imide (CsTFSI) and cesium fluoride (CsF), and mixtures thereof.

In one preferred embodiment, the film-forming additive according to the present invention is vinylene carbonate.

In the present invention, the total amount of the film-forming additive(s) may be from 0 to 30 wt %, preferably from 0 to 20 wt %, more preferably from 0 to 15 wt %, and even more preferably from 0 to 5 wt % with respect to the total weight of b) the liquid electrolyte solution.

The total amount of the film-forming additive(s), if contained in the liquid electrolyte solution of the present invention, may be from 0.05 to 10.0 wt %, preferably from 0.05 to 5.0 wt %, and more preferably from 0.05 to 2.0 wt % with respect to the total weight of b) the liquid electrolyte solution.

In a preferred embodiment, the total amount of film-forming additive(s) accounts for at least 1.0 wt % of b) the liquid electrolyte solution.

Should the disclosure of any patents, patent applications, and publications which are incorporated herein by reference conflict with the description of the present application to the extent that it may render a term unclear, the present description shall take precedence.

The invention will be now explained in more detail with reference to the following examples, whose purpose is merely illustrative and not intended to limit the scope of the invention.

EXAMPLES

Raw Materials
Dry cell: NCM523/Cu (current collector; 15 μm)/CCS (ceramic coated separator), commercially available from Lifun Technology (Model No.: 402035)
Fluorinated Ether Compounds:
1,1,2,2-tetrafluoroethyl-2,2,3,3-tetrafluoropropyl ether (TTE), commercially available from SynQuest
$CF_2HCF_2$—$OCH_2CH_2O$—$CF_2CF_2H$ ($C_6F_8H_6O_2$), synthesized within Solvay
difluoroethyl acetate (DFEA) available from Solvay
Methyl 2,2,2-trifluoroethyl carbonate ($F_3EMC$) available from Solvay
Non-Fluorinated Ether Compound:
1,2-dimethoxyethane (DME), commercially available from Enchem
Other Solvents
fluoroethylene carbonate (FEC), commercially available from Enchem
ethylene carbonate (EC), commercially available from Enchem
ethyl methyl carbonate (EMC), commercially available from Enchem
Li salt: lithium bis(fluorosulfonyl)imide (LiFSI), commercially available from Nippon Shokubai A/Formulation of the Electrolyte Compositions:
The electrolyte compositions were prepared for the Inventive Examples of E1-E2 and Comparative Examples of CE1-CE4. Their constituents are summarized in Table 1 below:

TABLE 1

| Examples | Solvent mixture | Li Salt |
| --- | --- | --- |
| E1 | DME/TTE (20/80)*(91.94)** | 1M LiFSI (8.06)** |
| E2 | DME/$C_6F_8H_6O_2$ (20/80)*(91.94)** | 1M LiFSI (8.06)** |
| CE1 | DME (100)*(91.94)** | 1M LiFSI (8.06)** |
| CE2 | DME/DFEA (20/80)*(91.94)** | 1M LiFSI (8.06)** |
| CE3 | FEC/F3EMC (20/80)*(91.94)** | 1M LiFSI (8.06)** |
| CE4 | FEC/EMC (20/80)*(91.94)** | 1M LiFSI (8.06)** |

*vol % with respect to the total volume of the solvent mixture
**vol % with respect to the total volume of the liquid electrolyte composition When preparing the electrolyte composition of E1, 1M LiFSI was first dissolved in 20 vol % of DME with respect to the total volume of the solvent mixture and was mixed using a magnetic stirrer within a glove box. After the solution became transparent, 80 vol % of TTE was added to the solution with respect to the total volume of the solvent mixture.

The electrolyte compositions of E2 were prepared in the same manner as E1, except $C_6F_8H_6O_2$ was used as a fluorinated ether compound instead of TTE. The solvent mixture for E1-E2 comprised 20 vol % of DME and 80 vol % of a fluorinated ether compound, respectively, with respect to the total volume of the solvent mixture.

When preparing the electrolyte composition of CE1, 1M LiFSI was dissolved in DME using a magnetic stirrer within a glove box.

When preparing the electrolyte composition of CE2, 1M LiFSI was first dissolved in 20 vol % of DME with respect to the total volume of the solvent mixture and was mixed using a magnetic stirrer within a glove box. After the solution became transparent, 80 vol % of DFEA was added to the solution with respect to the total volume of the solvent mixture.

When preparing the electrolyte composition of CE3, all the required compounds were added to one bottle and they were mixed until a transparent solution was obtained. 1M LiFSI was dissolved in a solvent mixture of 20 vol % of FEC and 80 vol % of F3EMC for CE3.

The electrolyte composition of CE4 was prepared by dissolving 20 vol % of FEC within 80 vol % of EMC first with respect to the total volume of the solvent mixture, and then 1M LiFSI was dissolved in said solvent mixture.

B/ Preparation of the Anode-Less Cells:

1-Drying and Electrolyte Injection

The NCM523/Cu dry cell without electrolyte from Lifun Technology was dried under vacuum at 55° C. for 2 days. The electrolyte composition as prepared was injected to the dry cell by pipetting (4.0 g/Ah). After injection, the dry cell was left under vacuum and the cell pressure released right after the vacuum. There were 3 times of vacuum-releasing process to wet the cathode materials After releasing the vacuum, the cell was left for additional 1 hour for sufficient wetting.

2-Sealing and $1^{st}$ Aging

After wetting, the cell was sealed by using a vacuum sealing machine under the pressure (up to 350 kPa), wherein the cell was sandwiched with two plates having screwing tools. Subsequently, the cell was left at room temperature for 1 day ($1^{st}$ aging).

C/ Activation of Cells and Measurement of Initial Cell Performance

1—$2^{nd}$ Aging (=Activation/Formation of the anode-free cell)

The cell was charged to a 30% level of State Of Charge (SOC) for 3 hours and then was left at 45° C. for another 1 day ($2^{nd}$ aging).

2—Degassing

The gas generated during the activation of the anode-free cell was removed by opening the cell and re-sealing the same.

D/ Performance Measurement of the Anode-Less Cells

The anode-free cells were tested at various conditions as detailed below:

1—Capacity check for 3 cycles

Charging: 0.1 C/4.2V/0.05 C at constant current and constant voltage (CC-CV)

Discharging: 0.1 C/3.6V (CC)

2—Continuous cycling test (up to 200 cycles)

Charging: 0.2 C/4.2V/0.05 C (CC-CV)

Discharging: 0.5 C/3.6V (CC)

E/ Cycle Tests—Capacity Retention:

The cycling ability of each cell was evaluated. Then, each cell was subjected to a repetition of cycles of charge and discharge. One cycle consisted of a charging phase at a charging current of C followed by a discharge phase at a discharge current of C. The following results were obtained as shown in Table 2 below:

TABLE 2

| Examples | Number of cycles at 80% of capacity retention |
|---|---|
| E1 | 150 |
| E2 | 196 |
| CE1 | Short-circuit |
| CE2 | Short-circuit |
| CE3 | 23 |
| CE4 | 19 |

Figure 2:
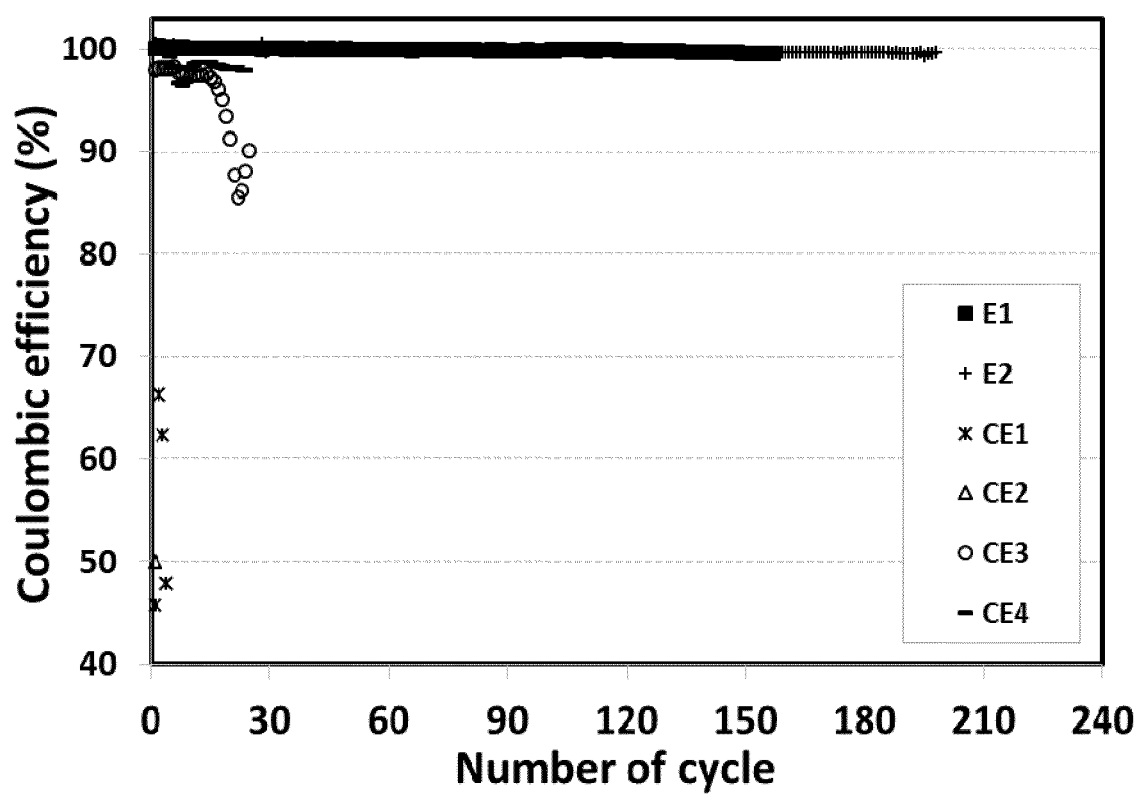
FIG. 2 shows Coulombic efficiency vs. cycle number of NCM523/Cu cells with electrolyte compositions of E1-E2 and CE1-CE4 at 3.6~4.2V (0.2 C/0.5 C).

FIGS. 1-2 show the variation of the capacity retention and the Coulombic efficiency of E1-E2 and CE1-CE4 as a function of the cycle number.

Notably, it was observed that the discharged capacity of E1-E2, all according to the present invention, decreased slowly as the number of cycles increased (FIG. 1). In particular, FIG. 2 clearly shows that the number of cycles at 80% of capacity retention for Inventive Examples, i.e., E1-E2, each comprising the electrolyte composition according to the invention, were much higher than those for Comparative Examples, i.e., CE1-CE4.

Among Inventive Examples of E1-E2, the number of cycles at 80% of capacity retention of E1 was the lowest, i.e., 150 cycles. However, such lowest number of E1 was already much higher than the number of cycles of Comparative Examples of CE1-CE4. The highest number of cycles at 80% of capacity retention among CE1-CE4 was 23 cycles from CE3, while CE1 and CE2 resulted in almost immediate short-circuits. It was hence clearly demonstrated that the cycling ability was improved according to the present invention.

Further, one can note that the Coulombic efficiency of Inventive Examples E1-E2 shown in FIG. 2 remained essentially constant up to at least 150 cycles and decreased as the cycles further increased, but very slowly, whereas the Coulombic efficiency of Comparative Examples CE1-CE4 decreased rapidly around 10~20 cycles.

The invention claimed is:

1. An anode-less lithium ion battery comprising:
   a) a cathode comprising a cathode current collector and a cathode electro-active material on the cathode current collector;
   b) an anode current collector;
   c) a liquid electrolyte composition between the a) cathode and the b) anode current collector; and
   d) a separator,
   wherein the c) liquid electrolyte composition comprises i) at least 70% by volume (vol %) of a solvent mixture with respect to the total volume of the electrolyte composition, comprising from 60 to 90 vol % of at least one fluorinated ether compound and from 10 to 40 vol % of at least one non-fluorinated ether compound the vol % being with respect to the total volume of the solvent mixture, wherein the fluorinated ether compound has a chemical formula of $C_aF_bH_cO_d$, wherein a,b,c and d are all integers, d is an integer from 1 to 3, a is an integer from 3 to 10, and $2*(a+1)=b+c$, and ii) at least one lithium salt.

2. The anode-less lithium ion battery according to claim 1, wherein the solvent mixture comprises:
   from 80 to 90 vol % of at least one fluorinated ether compound; and
   from 10 to 20 vol % of at least one non-fluorinated ether compound, with respect to the total volume of the solvent mixture.

3. The anode-less lithium ion battery according to claim 1, wherein the fluorinated ether compound comprises 1,1,2,2-tetrafluoroethyl-2,2,3,3-tetrafluoropropyl ether (TTE) and $CF_2HCF_2$—$OCH_2CH_2O$-$CF_2CF_2H$.

4. The anode-less lithium ion battery according to claim 1, wherein the non-fluorinated ether compound comprises dimethoxyethane (DME), 1,3-dioxolane (DOL), dibutyl ether, tetraethylene glycol dimethyl ether (TEGME), diethylene glycol dimethyl ether (DEGME), diethylene glycol diethyl ether (DEGDEE), polyethylene glycol dimethyl ether (PEGDME), 2-methyltetrahydrofuran and tetrahydrofuran (THF).

5. The anode-less lithium ion battery according to claim 1, wherein the cathode electro-active material is selected from the group consisting of $LiMQ_2$, wherein M is at least one metal selected from Co, Ni, Fe, Mn, Cr and V and Q is O or S; $LiNi_xCo_{1-x}O_2$ (0<x<1); spinel-structured $LiMn_2O_4$; lithium-nickel-manganese-cobalt-based metal oxide of formula $LiNi_xMn_yCo_zO_2$ (x+y+z=1), lithium-nickel-cobalt-aluminum-based metal oxide of formula $LiNi_xCo_yAl_zO_2$ (x+y+z=1), and $LiFePO_4$.

6. The anode-less lithium ion battery according to claim 1, wherein the cathode electro-active material is loaded onto the cathode current collector to have an areal capacity between 1.0 mAh/cm² and 10.0 mAh/cm².

7. The anode-less lithium ion battery according to claim 1, wherein the lithium salt is selected from the group consisting of:
   a) $LiN(SO_2F)_2$ (lithium bis(fluorosulfonyl)imide: LiFSI), $LiN(CF_3SO_2)_2$ (lithium bis(trifluoromethanesulfonyl)imide:LiTFSI), $LiPF_6$, $LiBF_4$, $LiClO_4$, Li bis(oxalato) borate (LiBOB), $LiCF_3SO_3$, LiF, LiCl, LiBr, LiI, $LiN(C_2F_5SO_2)_2$, $LiN(CF_3SO_2)(R_FSO_2)$, wherein $R_F$ is $C_2F_5$, $C_4F_9$ or $CF_3OCF_2CF_2$, $LiAsF_6$, $LiC(CF_3SO_2)_3$, $Li_2S$;

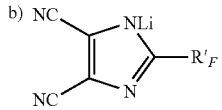

wherein $R'_F$ is selected from the group consisting of F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_3F_5OCF_3$, $C_2F_{40}CF_3$, $C_2H_2F_{20}CF_3$ and $CF_{20}CF_3$; and
   c) combinations thereof.

8. The anode-less lithium ion battery according to claim 1, wherein a concentration of the lithium salt is from 1 M to 8 M.

9. The anode-less lithium ion battery according to claim 1, wherein the d) separator is a porous polymeric material comprising at least one material selected from the group consisting of polyester, polyphenylene sulphide, polyacetal, polyamide, polycarbonate, polyimide, polyether sulfone, polyphenylene oxide, polyphenylene sulfide, polyethylene naphthalene, polyethylene oxide, polyacrylonitrile, polyolefin, or mixtures thereof.

10. The anode-less lithium ion battery according to claim 1, further comprising from 0.05 to 10.0 wt % of at least one film-forming additive, with respect to the total weight of the liquid electrolyte composition.

11. The anode-less lithium ion battery according to claim 10, wherein the film-forming additive is selected from the group consisting of cyclic sulphite and sulfate compounds comprising 1,3-propanesultone (PS), ethylene sulphite(ES) and prop-1-ene-1,3-sultone (PES); sulfone derivatives comprising dimethyl sulfone, tetramethylene sulfone, ethyl methyl sulfone and isopropyl methyl sulfone; nitrile derivatives comprising succinonitrile, adiponitrile, and glutaronitirle; and lithium nitrate ($LiNO_3$); boron derivatives salt comprising lithium difluoro oxalato borate (LiDFOB), lithium fluoromalonato (difluoro) borate (LiFMDFB), vinyl acetate, biphenyl benzene, isopropyl benzene, hexafluorobenzene, tris(trimethylsilyl)phosphate, triphenyl phosphine, ethyl diphenylphosphinite, triethyl phosphite, tris(2,2,2-trifluoroethyl) phosphite, maleic anhydride, vinylene carbonate, vinyl ethylene carbonate, mono-fluorinated ethylene carbonate (4-fluoro-1,3-dioxolan-2-one), difluorinated ethylene carbonate, cesium bis(triflulorosulfonyl)imide (CsTFSI), cesium fluoride (CsF), and mixtures thereof.

12. The anode-less lithium ion battery according to claim 10, wherein the film-forming additive is an ionic liquid.

13. The anode-less lithium ion battery according to claim 12, wherein the ionic liquid is selected from the group consisting of N-methyl-N-propylpyrrolidinium bis(fluorosulfonyl) imide (PYR13FSI), N-butyl-N-methylpyrrolidinium bis(fluorosulfonyl)imide (PYR14FSI), N-methyl-N-propylpyrrolidinium bis(trifluoromethanesulfonyl)imide (PYR13TFSI), and N-butyl-N-methylpyrrolidinium bis(trifluoromethanesulfonyl)imide (PYR14TFSI).

14. The anode-less lithium ion battery of claim 1, wherein the c) liquid electrolyte composition consists of i) at least 70% by volume (vol %) of a solvent mixture with respect to the total volume of the electrolyte composition, comprising at least one fluorinated ether compound and at least one non-fluorinated ether compound, ii) at least one lithium salt, and iii) optionally from 0.05 to 10.0 wt % of at least one film-forming additive, with respect to the total weight of the liquid electrolyte composition.

\* \* \* \* \*